(12) United States Patent
Gustavsson et al.

(10) Patent No.: US 12,480,837 B2
(45) Date of Patent: Nov. 25, 2025

(54) MONITORING OF A POWER DEVICE

(71) Applicant: Hitachi Energy Ltd, Zürich (CH)

(72) Inventors: Niklas Gustavsson, Ludvika (SE);
Tommy Larsson, Ludvika (SE);
Nilanga Abeywickrama, Västerås (SE);
Joachim Schiessling, Enköping (SE)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/697,766

(22) PCT Filed: Oct. 5, 2022

(86) PCT No.: PCT/EP2022/077701
§ 371 (c)(1),
(2) Date: Apr. 2, 2024

(87) PCT Pub. No.: WO2023/057514
PCT Pub. Date: Apr. 13, 2023

(65) Prior Publication Data
US 2024/0328894 A1 Oct. 3, 2024

(30) Foreign Application Priority Data
Oct. 6, 2021 (EP) ................................. 21201245

(51) Int. Cl.
*G01M 7/02* (2006.01)
(52) U.S. Cl.
CPC .................................. *G01M 7/025* (2013.01)
(58) Field of Classification Search
CPC ..................................................... G01M 7/025
See application file for complete search history.

(56) References Cited

U.S. PATENT DOCUMENTS 6,215,408 B1 * 4/2001 Leonard ............. G01R 31/3274
324/415
6,486,678 B1 * 11/2002 Spears ................... G01N 29/46
324/555

(Continued)

FOREIGN PATENT DOCUMENTS

CN 106324490 A 1/2017
CN 109557186 A * 4/2019 ........... G01N 29/045

(Continued)

OTHER PUBLICATIONS

International Search Report and Written Opinion, International Application No. PCT/EP2022/077701, mailed Jan. 18, 2023, 12 pages.

(Continued)

*Primary Examiner* — Natalie Huls
(74) *Attorney, Agent, or Firm* — Sage Patent Group (57) ABSTRACT

The present disclosure relates to a method for monitoring a power device. The method includes obtaining at least one frequency spectrum of at least one physical component of the power device, wherein the at least one frequency spectrum comprises at least one eigenfrequency of the at least one physical component of the power device; measuring, using at least one sensor, a vibroacoustic signal of the power device; and determining a signal contribution of the at least one physical component of the power device to the vibroacoustic signal based on the obtained at least one frequency spectrum. The present disclosure also relates to a respective monitoring device and a system including at least one sensor and a monitoring device.

16 Claims, 3 Drawing Sheets

(56) References Cited

U.S. PATENT DOCUMENTS

| | | | | |
|---|---|---|---|---|
| 10,345,141 | B2* | 7/2019 | Ledbetter | G01H 1/00 |
| 10,533,978 | B2* | 1/2020 | Benke | G01N 29/46 |
| 12,032,024 | B2* | 7/2024 | Boyaci | G01R 31/3333 |
| 2009/0091441 | A1* | 4/2009 | Schweitzer, III | G01M 13/028 |
| | | | | 340/531 |
| 2009/0278544 | A1* | 11/2009 | Webb | H01H 9/0005 |
| | | | | 385/12 |
| 2020/0363473 | A1* | 11/2020 | Tatemi | G01R 31/3274 |
| 2021/0123797 | A1* | 4/2021 | Kiesel | G01H 9/004 |
| 2022/0294262 | A1* | 9/2022 | Herterich | G01R 31/62 |
| 2022/0349957 | A1* | 11/2022 | You | G01R 31/62 |
| 2024/0103098 | A1* | 3/2024 | Sadeghnia | G01R 31/62 |

FOREIGN PATENT DOCUMENTS

| | | | | |
|---|---|---|---|---|
| DE | 20021970 | U1 * | 4/2001 | F03D 17/00 |
| EP | 3812711 | A2 | 4/2021 | |

OTHER PUBLICATIONS

International Preliminary Report on Patentability, International Application No. PCT/EP2022/077701, mailed Dec. 14, 2023, 16 pages.

* cited by examiner

FIG. 3

MONITORING OF A POWER DEVICE

CROSS REFERENCE TO RELATED APPLICATIONS

This application is a 35 U.S.C. § 371 national stage application of PCT International Application No. PCT/EP2022/077701 filed on Oct. 5, 2022, which in turn claims priority to European Patent Application No. 21201245.4, filed on Oct. 6, 2021, the disclosures and content of which are incorporated by reference herein in their entireties.

TECHNICAL FIELD

The present disclosure relates to a method and a device for monitoring a power device.

BACKGROUND

A power device, in particular comprising physical components operating mechanically, more particularly a tap changer, e.g., an on-load tap changer, OLTC, exhibits a vibroacoustic signal with a unique signature belonging to the assembled power device as a whole. Such vibroacoustic signal is ideally time-invariant given constant physical conditions of said physical components and environmental conditions. A defect in any of said physical components generates a vibroacoustic signal, which deviates from the obtained vibroacoustic signal with a unique signature belonging to the power converter. Thus, conventional methods identify defects in the power device by analysing the monitoring vibroacoustic signal based on the obtained vibroacoustic signal with a unique signature. The defects in the power device affect the performance thereof, in particular mechanical inconsistencies, and can potentially cause a power outage. Thus, it is of interest to identify the malfunction in the power device before the failure of the power device. In addition, it might be of interest once a malfunction occurred to identify its cause without disassembly of the device. It is particularly interesting to identify which of the physical components causes such deviation through signal processing, so as to replace the defected components without further examination. However, the conventional approaches fail to achieve such effect due to a complex superposition of vibroacoustic signals generated by simultaneous movements of individual physical components during operation of the power device.

EP 3 812 711 A2 relates to a fiber optic sensing system for grid-based assets. CN 106 324 490 A relates to a voltage transformer on-load tap-changer mechanical fault diagnosis.

Thus, there is a need to improve a method for monitoring a power device, in particular vibroacoustic monitoring of an on-load tap changer.

SUMMARY

The disclosed subject matter is specified by the independent claims. Additional embodiments are defined in the dependent claims. In the following description, although numerous features may be designated as optional, it is nevertheless acknowledged that all features comprised in the independent claims are not to be read as optional.

The present disclosure relates to a method for monitoring a power device, the method comprising: obtaining at least one frequency spectrum of at least one physical component of the power device, wherein the at least one frequency spectrum comprises at least one eigenfrequency of the at least one physical component of the power device; measuring, using at least one sensor, a vibroacoustic signal of the power device; and determining a signal contribution of the at least one physical component of the power device to the vibroacoustic signal based on the obtained at least one frequency spectrum.

According to an embodiment, the measuring a vibroacoustic signal of the power device is performed during operation of the device. In this context, during operation of the device may refer to the mechanical operation of at least one physical component of the power device, e.g., rotation or translational movement of at least one physical component. The mechanical operation may be performed by a respective motor or manually. The mechanical operation may be of the at least one physical component with the obtained at least one frequency spectrum but is not limited to. The mechanical operation may be of any other physical component of the power device.

According to an embodiment, the method further comprises transforming the measured vibroacoustic signal into frequency domain.

According to an embodiment, determining the signal contribution comprises comparing amplitudes and/or frequencies of the vibroacoustic signal with the obtained at least one frequency spectrum or with a previously measured vibroacoustic signal.

According to an embodiment, the method further comprises identifying at least one frequency component in the vibroacoustic signal which corresponds to the at least one eigenfrequency in the obtained at least one frequency spectrum.

According to an embodiment, the method further comprises identifying at least one physical component of the at least one physical component of the power device which causes a deviation in the vibroacoustic signal.

According to an embodiment, the method further comprises identifying an abnormal behaviour in the at least one physical component based on the determining of the signal contribution of the at least one physical component of the power device to the vibroacoustic signal.

According to an embodiment, the steps: measuring, using the at least one sensor, the vibroacoustic signal of the power device; and determining the signal contribution of the at least one physical component of the power device to the vibroacoustic signal based on the obtained at least one frequency spectrum; are executed when an abnormal behaviour in the power device has been detected.

According to an embodiment, the method further comprises iteratively measuring the vibroacoustic signal of the power device and determining the signal contribution of the at least one physical component of the power device to the vibroacoustic signal based on the obtained at least one frequency spectrum.

According to an embodiment, the obtained at least one frequency spectrum is obtained prior to assembly of the power device.

According to an embodiment, determining the signal contribution comprises at least one of truncating, filtering, and applying at least one transformation to the measured vibroacoustic signal.

According to an embodiment, determining the signal contribution comprises removing the identified at least one frequency component from the vibroacoustic signal.

According to an embodiment, the at least one transformation is or comprises at least one of a wavelet transformation, a Fourier transformation, a short-time Fourier transformation, a Hilbert transformation or a Wigner transformation.

According to an embodiment, the at least one sensor is or comprises any one of a vibration sensor, an accelerometer, a pressure sensor, a microphone, a hydrophone or an optical sensor. The optical sensor may be a laser doppler vibrometer.

The expression "vibroacoustic" in the context of the present disclosure may refer to any vibration signal, in particular to any vibration signal that can be measured by at least one of a vibration sensor, an accelerometer, a pressure sensor, a microphone, a hydrophone or an optical sensor.

According to an embodiment, the power device is or comprises at least one of an on-load tap changer, OLTC, a circuit breaker or a disconnector.

According to an embodiment, the at least one physical component is or comprises at least one of a tap changer housing, a diverter switch, a selector switch, at least one movable contact, or at least one vacuum interrupter.

According to an embodiment, the at least one sensor is attached or located anywhere on the exterior and/or interior of the power device. According to another embodiment, the at least one sensor is not attached to the power device. According to yet another embodiment, the at least one sensor measures an environmental condition, in particular a temperature and/or pressure. The at least one sensor may be a temperature sensor.

The present disclosure also relates to a monitoring device for monitoring a power device, the device comprising a processor configured to: obtain at least one frequency spectrum of at least one physical component of the power device, wherein the at least one frequency spectrum comprises at least one eigenfrequency of the at least one physical component of the power device; measure, using at least one sensor, a vibroacoustic signal of the power device; and determine a signal contribution of the at least one physical component of the power device to the vibroacoustic signal based on the obtained at least one frequency spectrum.

According to an embodiment, the measuring a vibroacoustic signal of the power device is performed during operation of the device. In this context, during operation of the device may refer to the mechanical operation of at least one physical component of the power device, e.g., rotation or translational movement of at least one physical component. The mechanical operation may be performed by a respective motor or manually. The mechanical operation may be of the at least one physical component with the obtained at least one frequency spectrum but is not limited to. The mechanical operation may be of any other physical component of the power device.

According to an embodiment, the processor is further configured to transform the measured vibroacoustic signal into frequency domain.

According to an embodiment, determining the signal contribution comprises comparing amplitudes and/or frequencies of the vibroacoustic signal with the obtained at least one frequency spectrum or with a previously measured vibroacoustic signal.

According to an embodiment, the processor is further configured to identify at least one frequency component in the vibroacoustic signal which corresponds to the at least one eigenfrequency in the obtained at least one frequency spectrum.

According to an embodiment, the processor is further configured to identify at least one physical component of the at least one physical component of the power device which causes a deviation in the vibroacoustic signal.

According to an embodiment, the processor is further configured to identify an abnormal behaviour in the at least one physical component based on the determining of the signal contribution of the at least one physical component of the power device to the vibroacoustic signal.

According to an embodiment, the processor is further configured to execute: measuring the vibroacoustic signal of the power device; and determining the signal contribution of the at least one physical component of the power device to the vibroacoustic signal based on the obtained at least one frequency spectrum; when an abnormal behaviour in the power device has been detected.

According to an embodiment, the processor is further configured to iteratively measure the vibroacoustic signal of the power device and determine the signal contribution of the at least one physical component of the power device to the vibroacoustic signal based on the obtained at least one frequency spectrum.

According to an embodiment, the obtained at least one frequency spectrum is obtained prior to assembly of the power device.

According to an embodiment, determining the signal contribution comprises at least one of truncating, filtering, and applying at least one transformation to the measured vibroacoustic signal.

According to an embodiment, determining the signal contribution comprises removing the identified at least one frequency component from the vibroacoustic signal.

According to an embodiment, the at least one transformation is or comprises at least one of a wavelet transformation, a Fourier transformation, a short-time Fourier transformation, a Hilbert transformation or a Wigner transformation.

According to an embodiment, the at least one sensor is or comprises any one of a vibration sensor, an accelerometer, a pressure sensor, a microphone, a hydrophone or an optical sensor. The optical sensor may be a laser doppler vibrometer.

According to an embodiment, the power device is or comprises at least one of an on-load tap changer, OLTC, a circuit breaker or a disconnector.

According to an embodiment, the at least one physical component is or comprises at least one of a tap changer housing, a diverter switch, a selector switch, at least one movable contact, or at least one vacuum interrupter.

The present disclosure also relates to a system comprising a power device, at least one sensor and a monitoring device according to any one of the aforementioned embodiments.

Various exemplary embodiments of the present disclosure disclosed herein are directed to providing features that will become readily apparent by reference to the following description when taken in conjunction with the accompanying drawings. In accordance with various embodiments, exemplary systems, methods, and devices are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

In the following, exemplary embodiments of the disclosure will be described. It is noted that some aspects of any one of the described embodiments may also be found in some other embodiments unless otherwise stated or obvious. However, for increased intelligibility, each aspect will only be described in detail when first mentioned and any repeated description of the same aspect will be omitted.

Figure 1:
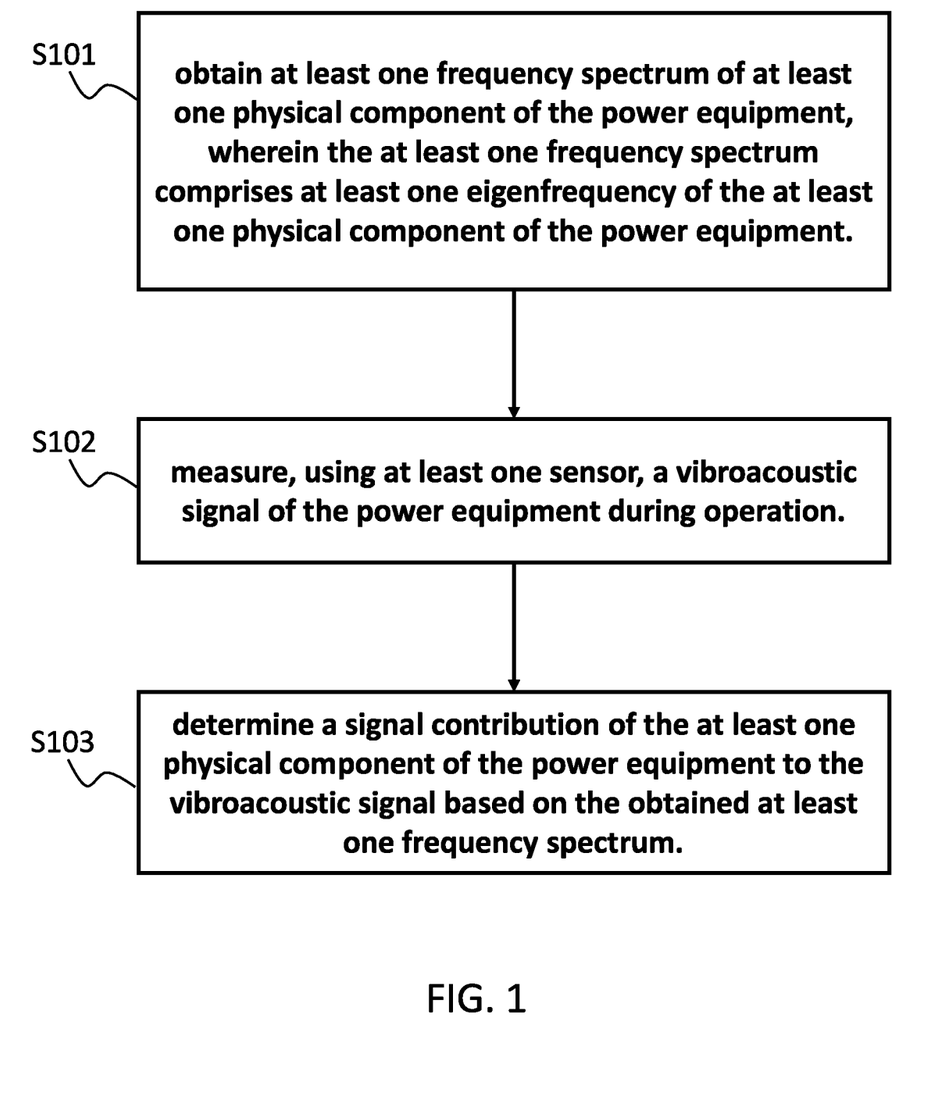
FIG. 1 shows a flow chart of a method, according to an embodiment of the present disclosure.

FIG. 1 shows a flow chart of a method, according to an embodiment of the present disclosure.

In step S101, the method obtains at least one frequency spectrum of at least one physical component of the power device, wherein the at least one frequency spectrum comprises at least one eigenfrequency of the at least one physical component of the power device.

Then, in step S102, the method measures, using at least one sensor, a vibroacoustic signal of the power device, in particular during operation of the power device.

In step S103, the method determines a signal contribution of the at least one physical component of the power device to the vibroacoustic signal based on the obtained at least one frequency spectrum.

According to an embodiment, the measuring a vibroacoustic signal of the power device is performed during operation of the device. In this context, during operation of the device may refer to the mechanical operation of at least one physical component of the power device, e.g., rotation or translational movement of at least one physical component. The mechanical operation may be performed by a respective motor or manually. The mechanical operation may be of the at least one physical component with the obtained at least one frequency spectrum but is not limited to. The mechanical operation may be of any other physical component of the power device.

According to an embodiment, determining the signal contribution comprises comparing amplitudes and/or frequencies of the vibroacoustic signal with the obtained at least one frequency spectrum or with a previously measured vibroacoustic signal.

According to an embodiment, the method further comprises identifying at least one frequency component in the vibroacoustic signal which corresponds to the at least one eigenfrequency in the obtained at least one frequency spectrum.

According to an embodiment, the method further comprises identifying at least one physical component of the at least one physical component of the power device which causes a deviation in the vibroacoustic signal.

According to an embodiment, the method further comprises identifying an abnormal behaviour in the at least one physical component based on the determining of the signal contribution of the at least one physical component of the power device to the vibroacoustic signal.

According to an embodiment, the steps: measuring, using the at least one sensor, the vibroacoustic signal of the power device; and determining the signal contribution of the at least one physical component of the power device to the vibroacoustic signal based on the obtained at least one frequency spectrum; are executed when an abnormal behaviour in the power device has been detected.

According to an embodiment, the method further comprises iteratively measuring the vibroacoustic signal of the power device and determining the signal contribution of the at least one physical component of the power device to the vibroacoustic signal based on the obtained at least one frequency spectrum.

Figure 2:
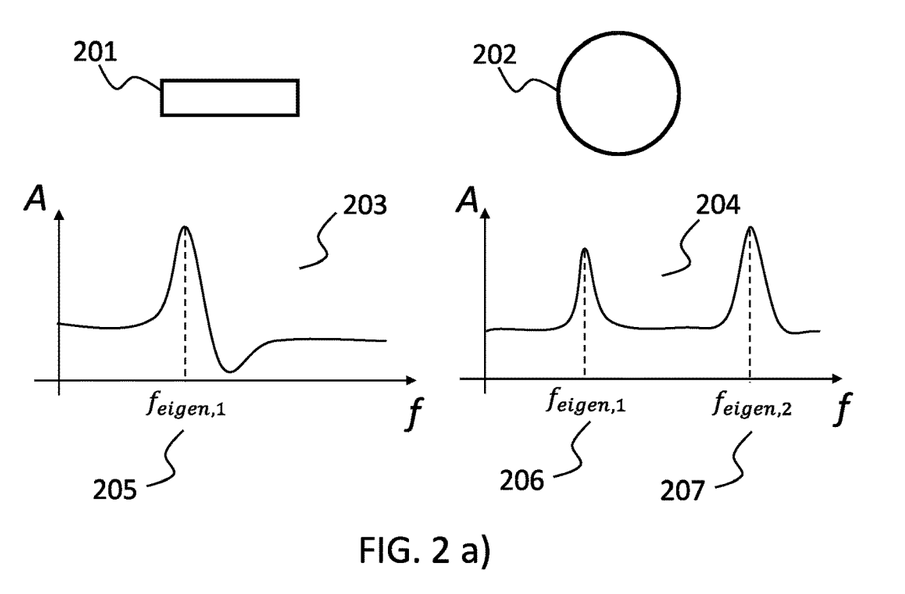
FIG. 2a) illustrates a method of obtaining eigenfrequency spectrums, according to an embodiment of the present disclosure.
FIG. 2b) illustrates a system comprising a device comprising a processor and a power device, according to an embodiment of the present disclosure.

FIG. 2a) illustrates a method of obtaining eigenfrequency spectrums, according to an embodiment of the present disclosure. A first physical component 201 exhibits a unique frequency characteristic with a first eigenfrequency 205 and the corresponding frequency spectrum 203 is plotted. Similarly, a second physical component 202 exhibits a unique frequency characteristic with a first eigenfrequency 206 and a second eigenfrequency 207 and the corresponding frequency spectrum 204 is plotted. In the embodiment shown in FIG. 2 a), the frequency characteristics of the physical components 201 and 202 of a power device are obtained before the power device is assembled. It is understood by the skilled person in the art that the shapes of the first physical component 201 and the second physical component 202 are of illustrative nature and can take any shape. It is further understood by the skilled person that the frequency characteristics plotted in the frequency spectrums 203 and 204 may be in any shape, from which eigenfrequencies are derived.

FIG. 2b) illustrates a system comprising a device comprising a processor and a power device, according to an embodiment of the present disclosure. In particular, the system 250 comprises a power device, e.g., an OLTC, 270 which comprises the first physical component 201 and the second physical component 202. A sensor 272, which might also be part of the system 250, is attached to the OLTC 270 and measures the vibration of the OLTC 270. It is understood by the skilled person that the sensor 272 does not need to be attached or connected to the power device. For example, optical sensors exist in the art which can measure vibration signals from a distance. The measured vibration data, i.e., the vibroacoustic signal, 274 is fed to the device 260. A processor 265 of the device 260 is configured to determine a signal contribution of the first physical component 202 and the second physical component 203 of the OLTC 270 to the vibroacoustic signal 274 based on the obtained frequency spectrums 203 and 204.

According to an embodiment, the at least one sensor is attached or located anywhere on the exterior and/or interior of the power device. According to another embodiment, the at least one sensor is not attached to the power device.

According to yet another embodiment, the at least one sensor measures an environmental condition, in particular a temperature and/or pressure.

According to an embodiment, the obtained at least one frequency spectrum is obtained prior to assembly of the power device.

According to an embodiment, determining the signal contribution comprises at least one of truncating, filtering, and applying at least one transformation to the measured vibroacoustic signal.

According to an embodiment, determining the signal contribution comprises removing the identified at least one frequency component from the vibroacoustic signal.

According to an embodiment, the at least one transformation is or comprises at least one of a wavelet transformation, a Fourier transformation, a short-time Fourier transformation, a Hilbert transformation or a Wigner transformation.

According to an embodiment, the at least one sensor is or comprises any one of a vibration sensor, an accelerometer, a pressure sensor, a microphone, a hydrophone or an optical sensor. The optical sensor may be a laser doppler vibrometer.

According to an embodiment, the power device is or comprises at least one of an on-load tap changer, OLTC, a circuit breaker or a disconnector.

According to an embodiment, the at least one physical component is or comprises at least one of a tap changer housing, a diverter switch, a selector switch, at least one movable contact, or at least one vacuum interrupter.

According to an embodiment, the device is further configured to transform the measured vibroacoustic signal into frequency domain.

According to an embodiment, determining the signal contribution comprises comparing amplitudes and/or frequencies of the vibroacoustic signal with the obtained at least one frequency spectrum or with a previously measured vibroacoustic signal.

According to an embodiment, the device is further configured to identify at least one frequency component in the vibroacoustic signal which corresponds to the at least one eigenfrequency in the obtained at least one frequency spectrum.

According to an embodiment, the device is further configured to identify at least one physical component of the at least one physical component of the power device which causes a deviation in the vibroacoustic signal.

According to an embodiment, the device is further configured to identify an abnormal behaviour in the at least one physical component based on the determining of the signal contribution of the at least one physical component of the power device to the vibroacoustic signal.

According to an embodiment, the device is further configured to execute: measuring the vibroacoustic signal of the power device; and determining the signal contribution of the at least one physical component of the power device to the vibroacoustic signal based on the obtained at least one frequency spectrum; when an abnormal behaviour in the power device has been detected.

According to an embodiment, the device is further configured to iteratively measure the vibroacoustic signal of the power device during operation and determine the signal contribution of the at least one physical component of the power device to the vibroacoustic signal based on the obtained at least one frequency spectrum.

According to an embodiment, the obtained at least one frequency spectrum is obtained prior to assembly of the power device.

According to an embodiment, determining the signal contribution comprises at least one of truncating, filtering, and applying at least one transformation to the measured vibroacoustic signal.

According to an embodiment, determining the signal contribution comprises removing the identified at least one frequency component from the vibroacoustic signal.

According to an embodiment, the at least one transformation is or comprises wavelet transformation or short-time Fourier transformation.

According to an embodiment, the at least one sensor is or comprises any one of a vibration sensor, an accelerometer, a pressure sensor, a microphone, a hydrophone or an optical sensor.

According to an embodiment, the power device is or comprises at least one of an on-load tap changer, OLTC, a circuit breaker or a disconnector.

According to an embodiment, the at least one physical component is or comprises at least one of a tap changer housing, a diverter switch, a selector switch, at least one movable contact, or at least one vacuum interrupter.

Figure 3:
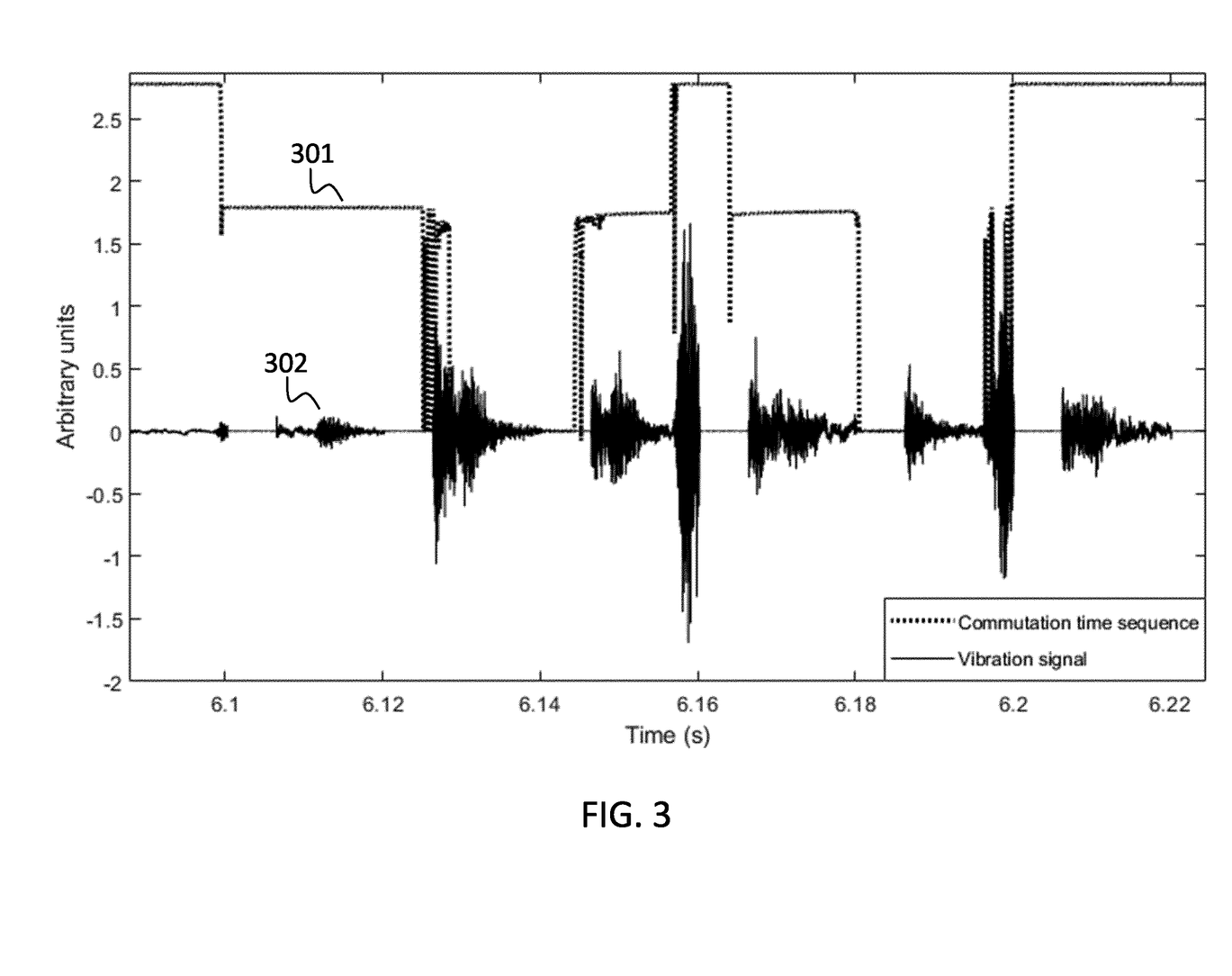
FIG. 3 illustrates a measurement result of an on-load tap changer, OLTC, according to an embodiment of the present disclosure.

FIG. 3 illustrates a measurement result of an on-load tap changer, OLTC, according to an embodiment of the present disclosure. Particularly, the commutation time sequence 301 is plotted against time which represents an electrical measurement, for instance a voltage, of the OLTC during switching sequences. Similarly, the vibration signal 302 of the OLTC is measured using at least one sensor and is plotted against time. The commutation time sequence 201 comprises three steps of absolute values and the transition among the steps indicate mechanical movements of physical components inside the OLTC, which consequently results in the vibration signal 302. Generally, the vibration signal 302 lags behind the commutation time sequence 301. By processing the vibration signal 302, e.g., by truncating, filtering and/or applying at least one transformation, the signal contribution of one or more physical components of the OLTC can then be determined.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques. To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall device. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative methods, logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for monitoring a power device, the method comprising:
    obtaining a first frequency spectrum for a first physical component of the power device and a second frequency spectrum for a second physical component of the power device, wherein the first frequency spectrum comprises at least one eigenfrequency of the first physical component and the second frequency spectrum comprises at least one eigenfrequency of the second physical component, and wherein the obtained first frequency spectrum and the obtained second frequency spectrum are obtained prior to assembly of the power device;
    measuring, using at least one sensor, a vibroacoustic signal of the power device; and
    determining a signal contribution for each of the first physical component and the second physical component of the power device to the vibroacoustic signal based on the obtained first frequency spectrum and the obtained second frequency spectrum.

2. The method of claim 1, comprising transforming the measured vibroacoustic signal into frequency domain.

3. The method of claim 1, wherein determining the signal contribution comprises comparing amplitudes and/or frequencies of the vibroacoustic signal with the obtained at least one frequency spectrum or with a previously measured vibroacoustic signal.

4. The method of claim 1, comprising identifying at least one frequency component in the vibroacoustic signal which corresponds to the at least one eigenfrequency in the obtained at least one frequency spectrum.

5. The method of claim 4, wherein determining the signal contribution comprises removing the identified at least one frequency component from the vibroacoustic signal.

6. The method of claim 1, comprising identifying at least one physical component of the at least one physical component of the power device which causes a deviation in the vibroacoustic signal.

7. The method of claim 1, comprising identifying an abnormal behaviour in the at least one physical component based on the determining of the signal contribution of the at least one physical component of the power device to the vibroacoustic signal.

8. The method of claim 1, wherein:
measuring, using the at least one sensor, the vibroacoustic signal of the power device; and
determining the signal contribution of the at least one physical component of the power device to the vibroacoustic signal based on the obtained at least one frequency spectrum;
are executed when an abnormal behaviour in the power device has been detected.

9. The method of claim 1, comprising iteratively measuring the vibroacoustic signal of the power device and determining the signal contribution of the at least one physical component of the power device to the vibroacoustic signal based on the obtained at least one frequency spectrum.

10. The method of claim 1, wherein determining the signal contribution comprises at least one of truncating, filtering, and applying at least one transformation to the measured vibroacoustic signal.

11. The method of claim 10, wherein the at least one transformation is or comprises at least one of a wavelet transformation, a Fourier transformation, a short-time Fourier transformation, a Hilbert transformation, or a Wigner transformation.

12. The method of claim 1, wherein the at least one sensor is or comprises any one of a vibration sensor, an accelerometer, a pressure sensor, a microphone, a hydrophone, or an optical sensor.

13. The method of claim 1, wherein the power device is or comprises at least one of an on-load tap changer (OLTC) a circuit breaker, or a disconnector.

14. The method of claim 1, wherein the at least one physical component is or comprises at least one of a tap changer housing, a diverter switch, a selector switch, at least one movable contact, or at least one vacuum interrupter.

15. A monitoring device for monitoring a power device, the device comprising a processor configured to carry out the method of claim 1.

16. A system comprising a power device, at least one sensor and a monitoring device according to claim 15.

* * * * *